(12) United States Patent
Bergler

(10) Patent No.: US 7,021,551 B2
(45) Date of Patent: Apr. 4, 2006

(54) DATA CARRIER COMPRISING EVALUATION MEANS FOR EVALUATING INFORMATION REPRESENTED BY AN INFORMATION VOLTAGE

(75) Inventor: Ewald Bergler, Weiz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/516,845

(22) PCT Filed: May 16, 2003

(86) PCT No.: PCT/IB03/01963

§ 371 (c)(1),
(2), (4) Date: Dec. 3, 2004

(87) PCT Pub. No.: WO03/105076

PCT Pub. Date: Dec. 18, 2003

(65) Prior Publication Data

US 2005/0178844 A1  Aug. 18, 2005

(30) Foreign Application Priority Data

Jun. 7, 2002 (EP) .................................. 02100674

(51) Int. Cl.
*G06K 19/06* (2006.01)
(52) U.S. Cl. ...................... 235/492; 235/487
(58) Field of Classification Search ................ 235/492, 235/487; 240/572.1
See application file for complete search history.

(56) References Cited

U.S. PATENT DOCUMENTS

| 4,847,725 A | * | 7/1989 | Ishii ............................. 361/96 |
| 5,973,975 A | * | 10/1999 | Raad ........................... 365/207 |
| 6,147,825 A | * | 11/2000 | Alini et al. ..................... 360/51 |
| 6,294,997 B1 | * | 9/2001 | Paratore et al. ........... 340/572.1 |

* cited by examiner

*Primary Examiner*—Daniel Stcyr
*Assistant Examiner*—Lisa M. Caputo
(74) *Attorney, Agent, or Firm*—Adam L. Stroud

(57) ABSTRACT

In a data carrier (1) that is arranged to receive a signal (S) in a non-contacting manner there is provided a circuit (2) that is arranged, by using the signal (S), to generate a supply voltage (V) for parts of the circuit (2), the circuit (2) has a storage stage (5) that is arranged to store information capacitively, the information being represented by a value of an information voltage (UI) arising at the storage stage (5), which value of the information voltage (UI) is at most equal to the value of the supply voltage (V), and the circuit (2) has an evaluation stage (14) to which the information voltage can be fed and that are arranged to evaluate the information voltage (UI), with the help of a comparison voltage (UC), for the information represented by the information voltage (UI), the comparison-voltage generating stage (15) that is arranged to generate and emit the comparison voltage (UC) being implemented separately from the evaluation stage (14), and the evaluation stage (14) being arranged to receive the comparison voltage (UC).

11 Claims, 2 Drawing Sheets

DATA CARRIER COMPRISING EVALUATION MEANS FOR EVALUATING INFORMATION REPRESENTED BY AN INFORMATION VOLTAGE

The invention relates to a data carrier that is arranged to receive a signal in a non-contacting manner and that has an electrical circuit, to which circuit the signal can be fed and which circuit is arranged to generate a supply voltage for parts of the circuit by using the signal, which circuit comprises storage means that are arranged to store information capacitively, the information being represented by a value of an information voltage arising at the storage means, which value is at most equal to the value of the supply voltage, and which circuit has evaluation means to which the information voltage can be fed and that are arranged to evaluate the information voltage, with the help of a comparison voltage, for the information represented by the information voltage.

The invention further relates to a circuit for a data carrier, which data carrier is arranged to receive a signal in a non-contacting manner, which circuit is arranged to generate a supply voltage for parts of the circuit by using the signal, which circuit comprises storage means that are arranged to store information capacitively, the information being represented by a value of an information voltage arising at the storage means, which value is at most equal to the value of the supply voltage, and which circuit has evaluation means to which the information voltage can be fed and that are arranged to evaluate the information voltage, with the help of a comparison voltage, for the information represented by the information voltage.

A data carrier of the kind described in the first paragraph above and a circuit of the kind described in the second paragraph above are known from the published draft ISO/IEC CD 18000 of the ISO/IEC 18000 standard that is currently being produced.

The known data carrier that has the known circuit and that is arranged to receive, in a non-contacting manner, a signal emitted by a read/write station, it being possible for a supply voltage for parts of the circuit to be generated by the circuit by using the signal, has storage means that are formed by a capacitor and that are arranged to store communication-related information relating to communication between the data carrier and the read/write station, in which case the communication-related information is intended to be capable of evaluation for a period of time. The information is represented by a value of an information voltage that arises at the capacitor. Also provided in the data carrier are evaluation means that are connected to the capacitor, that are implemented in the form of an inverter stage and that are arranged to evaluate the information voltage for the information that is represented by means of the information voltage. For this purpose, the inverter stage has, between the supply voltage and a reference potential for the circuit a p-channel field effect transistor and an n-channel field effect transistor arranged in series with one another, via whose control electrodes the information voltage can be fed to them. The two transistors have a transistor threshold voltage, it being possible for a first logic state able to be represented by the information voltage and a second logic state able to be represented by the information voltage to be evaluated using the respective transistor threshold voltages, which form comparison voltages.

With the known data carrier, there is the problem that, due to the respective transistor threshold voltages that are intrinsic properties of the transistors, there is needed, to enable the information voltage to be correctly evaluated, a relatively large signal-to-noise-voltage ratio between the values of the information voltage intended to represent the two logic states and the value of the supply voltage. Such a signal-to-noise-voltage ratio does not exist when the supply voltage is relatively low. There is also the problem that, even though the information voltage to represent the first logic state may be of a sufficiently high value to allow it to be evaluated by the n-channel field effect transistor at the time when it is generated, its value will, due to unavoidable leakage currents in the circuit, no longer be sufficiently high to allow the original information to be correctly evaluated after only a relatively short period of time.

It is an object of the invention to remedy the problems detailed above in a data carrier of the kind described in the first paragraph above and in a circuit of the kind described in the second paragraph above and to provide an improved data carrier and an improved circuit.

To achieve the above object, provision is made, in accordance with the invention, in a data carrier of the kind described in the first paragraph above, for comparison-voltage generating means that are arranged to generate and emit the comparison voltage to be implemented separately from the evaluation means, and for the evaluation means to be arranged to receive the comparison voltage from the comparison-voltage generating means.

To achieve the above object, provision is made, hi accordance with the invention, in a circuit of the kind described in the second paragraph above, for comparison-voltage generating means that are arranged to generate and emit the comparison voltage to be implemented separately from the evaluation means, and for the evaluation means to be arranged to receive the comparison voltage from the comparison-voltage generating means.

What is achieved in an advantageous manner by the provisions made in accordance with the invention is that it is possible for the information voltage to be evaluated irrespective of intrinsic parameters of the components of the evaluation means that are intended to make the evaluation. It also gives the advantage that signal-to-noise-voltage ratio for information voltages intended to represent the two logic values can be relatively small relative to the value of the supply voltage. This gives the further advantage that the evaluation can be reliably performed for any value of the information voltage U1 virtually without being affected by the leakage currents.

In the case of the solutions according to the invention, it has further proved to be advantageous if the features detailed in claim 2 and claim 7 are also provided in the respective cases. This gives the advantage that the evaluation of the information voltage can be performed not by making a comparison of the absolute value of the information voltage with parameters forming intrinsic characteristics of the components but by looking at a difference between the information voltage and the comparison voltage, which produces a considerable gain in sensitivity for the evaluation. This also gives the advantage that, within a supply-voltage range that is required for the safe and reliable operation of the circuit, the evaluation of the information voltage can be reliably performed virtually irrespective of the supply voltage.

In the case of the solutions according to the invention, it has also proved advantageous if the features detailed in claim 3 and claim 8 are provided in the respective cases. This gives the advantage that it is possible to perform a determination of the values of the leakage currents, which currents cause a degradation of the information voltage, or of the behavior of said leakage currents over time.

In the cases of the solutions according to the invention, it has also proved advantageous if the features detailed in claim 4 and claim 9 are provided in the respective cases. This gives the advantage that the comparison voltage intended for comparison with the information voltage can be set as a proportion of the value of the supply voltage at the time, thus ensuring that the information voltage and the comparison voltage always bear a relationship to one another such that they can in fact be compared.

In the case of the solutions according to the invention, it has also proved advantageous if the features detailed in claim 5 and claim 10 are provided in the respective cases. This gives the advantage that different comparison voltages can be used as a function of different operating states of the data carrier or different applications of the data carrier, which means for example that the period of time available for evaluating the information voltage can be dependent on the particular circumstances.

These and other aspects of the invention are apparent from and will be elucidated with reference to the embodiment described hereinafter.

Figure 1:
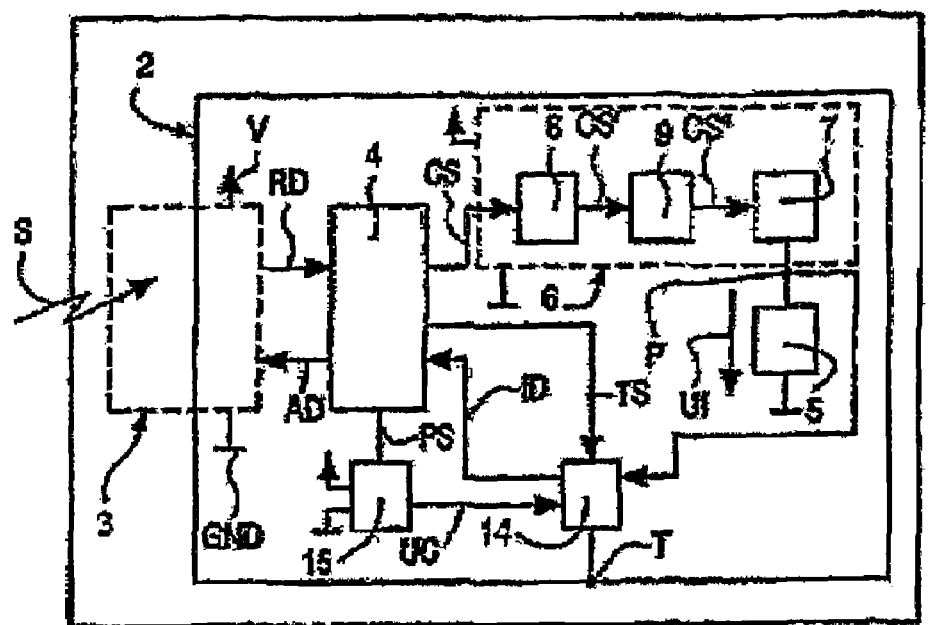
FIG. 1 is a diagrammatic block circuit diagram of one embodiment of data carrier according to the invention.

Shown in FIG. 1 is a data carrier 1 that is arranged for non-contacting communication with a communication station that is not shown in FIG. 1. For this purpose the data carrier 1 is arranged to receive a signal S from the communication station in a non-contacting manner, the signal being formed by a high-frequency carrier wave so that the data carrier 1 can be supplied with energy by means of signal S. It is also possible for enquiry information to be communicated from the communication station to the data carrier 1 by means of the signal S, in which case the signal is an amplitude modulation of the carrier wave. It is further possible for answer information to be communicated from the data carrier 1 to the communication station by means of signal S, in which case the signal is a load modulation able to be produced by the data carrier 1.

The data carrier 1 has an electrical integrated circuit 2. The circuit 2 has components of transmit/receive means 3 that are arranged to receive the signal S. For this purpose the transmit/receive means 3 have a transmission coil configuration (not shown in FIG. 1) that is coupled to the circuit 2, thus enabling the signal S to be fed to the circuit 2. The transmit/receive means 3 are further arranged, by using the signal S, to generate a supply voltage V relative to a reference potential GND for parts of the circuit. The transmit/receive means 3 are further arranged to demodulate the received signal S, which is modulated in this case, and to emit enquiry data RD that is communicated by means of the modulated signal S received. The transmit/receive means 3 are further arranged to receive answer data AD and, for the purpose of transmitting the answer data AD, to load modulate the received signal S, that is unmodulated in this case.

The circuit 2 also has data-processing means 4 that are implemented in the form of a microprocessor, which microprocessor also has a memory. Tie data-processing means 4 are arranged to receive the enquiry data RD and to process the enquiry data RD and, as a function of the enquiry data RD, to generate the answer data AD and to emit the answer data AD to the transmit/receive means 3.

The circuit 2 further has storage means 5 that are arranged to store information capacitively, the information being represented by a value of an information voltage UI that arises at the storage means 5. Unlike the information stored by the memory of the microprocessor, the information stored by the storage means 5 is intended to be available merely for a period of time and to temporarily indicate a communication status occurring during a communication. The storage means 5 are implemented in the form of a storage capacitor 5A shown in FIG. 2.

Figure 2:
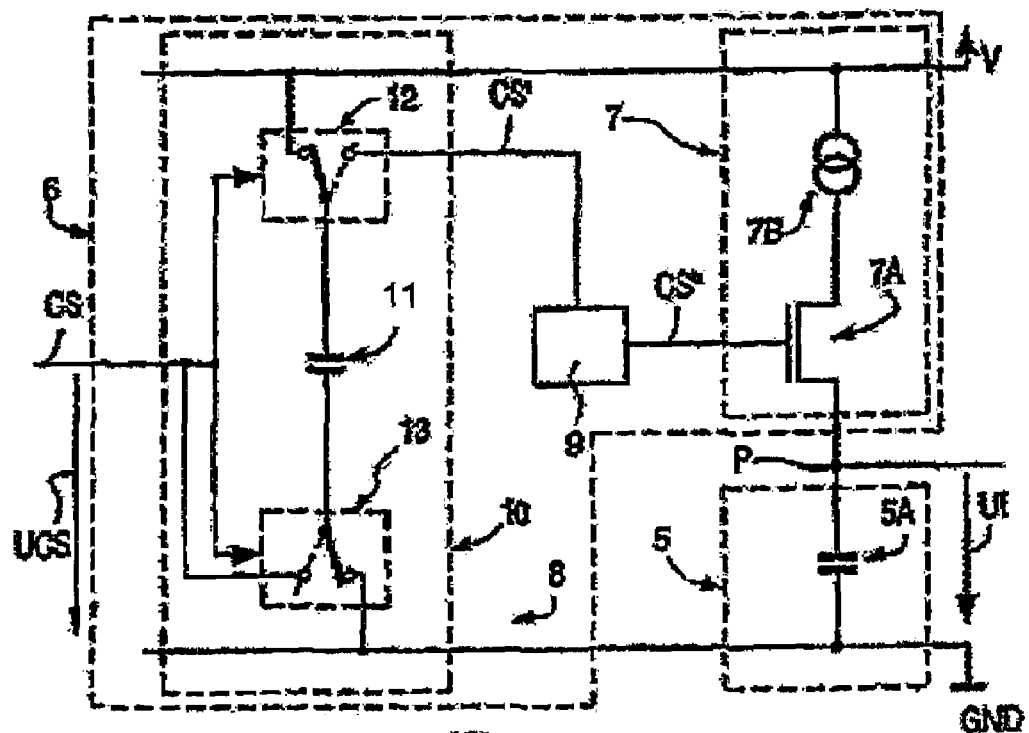
FIG. 2 is a view similar to FIG. 1 showing a first detail of the data carrier according to the invention shown in FIG. 1.

The circuit 2 further has information-voltage generating means 6 that are arranged to receive a control signal CS, which control signal CS is of a voltage value UCS that is at most equal to the value of the supply voltage V. The information-voltage generating means 6 are further arranged to generate the information voltage UI by using the control signal CS. For this purpose, the information-voltage generating means 6 have a charging-current generating stage 7 that is arranged to generate and emit a charging current for the storage means 5. As shown in FIG. 2, the charging-current generating stage 7 is implemented in the form of a first n-channel field effect transistor 7A whose source terminal is connected to the storage capacitor SA. The charging-current generating stage 7 further has a current source 7B that is arranged to generate the charging current for the storage capacitor SA and that is connected in series with the first n-channel field effect transistor 7A between said first n-channel field effect transistor 7A and the supply voltage V. The information voltage UI can be picked off relative to the reference potential GND at a point P in the circuit situated between the information-voltage generating means 6 and the storage means 5.

The information-voltage generating means 6 further have voltage-raising means 8 that are arranged to receive the control signal CS and to raise the value UCS of the voltage of the control signal CS. The voltage-raising means 8 are further arranged to emit a control signal CS' of raised voltage. The information-voltage generating means 6 further have voltage-limiting means 9 that are arranged between the voltage-raising means 8 and the charging-current generating stage 7 and that are arranged to receive the control signal CS' of raised voltage and to emit a control signal CS2" of limited voltage, which control signal CS2" represents the control signal CS, to the charging-current generating stage 7 or rather to the gate terminal of the first n-channel field effect transistor 7A.

As shown in FIG. 2, the voltage-raising means 8 are implemented in the form of a charge pump 10, which charge pump 10 has a charge-pump capacitor 11, a first switch 12 and a second switch 13. The control signal CS can be fed to the two switches 12 and 13. The two switches 12 and 13 are shown in a rest position in FIG. 2. The charge-pump capacitor 11 is connected between the supply voltage V and the reference potential GND, as a result of which the voltage applied to the charge-pump capacitor 11 assumes the value of the supply voltage V. If the control signal CS is received, the two switches 12 and 13 are arranged to switch over from their rest state to an active state, as indicated in FIG. 2 by broken lines. With the switches in this active state, the charge-pump capacitor 11 is connected between the voltage-limiting means 9 and the data-processing means 4, which means that the voltage value UCS can be raised by the value of the supply voltage V at the input to the voltage-limiting means 9. The two switches 12 and 13 are implemented in the form of field effect transistors. The voltage-limiting means 9 are implemented in the form of a diode configuration (not shown in FIG. 2), thus enabling the voltage value of the control signal CS' of raised voltage to be limited to a value compatible with use in the charging-current control stage 7.

This gives the advantage that the supply voltage V available can be used in the optimum way to generate the information voltage U1.

The data carrier 1 shown in FIG. 1 further has evaluation means 14 to which the information voltage UI arising at the point P in the circuit can be fed and that, with the help of a comparison voltage UC, are arranged to evaluate the information voltage UI for the information that is represented by said information voltage U1. The evaluation means 14 are arranged to receive the comparison voltage UC. For the purpose of generating the comparison voltage UC, the data carrier 1 has comparison-voltage generating means 15 that are implemented separately from the evaluation means 14 and that are arranged to generate the comparison voltage UC and emit it to the evaluation means 14.

Figure 3:
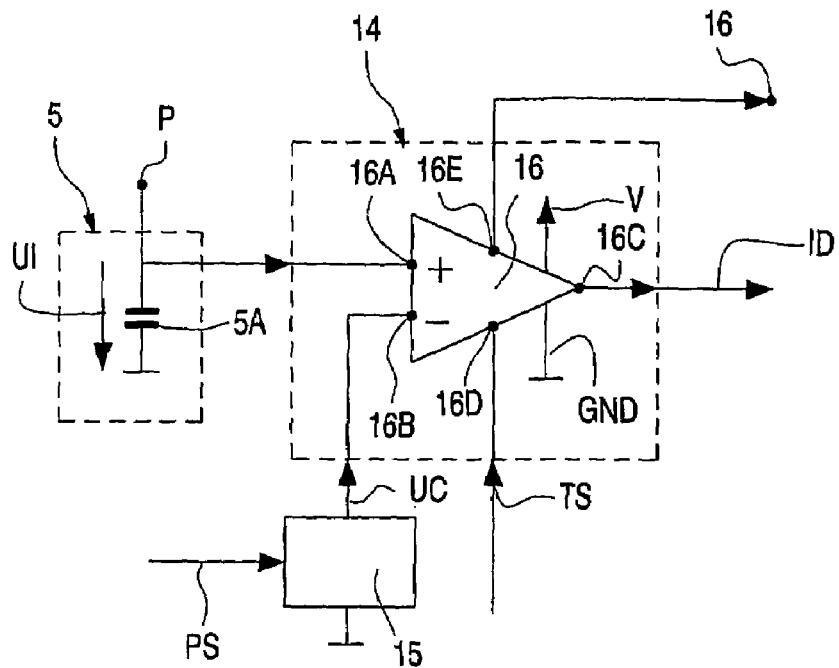
FIG. 3 is a view similar to FIG. 1 showing a second detail of the data carrier according to the invention shown in FIG. 1.

The evaluation means 14 are implemented in the form of a difference amplifier stage 16 as schematically indicated in FIG. 3. The difference amplifier stage 16 has a first input 16A at which the information voltage UI can be fed to it. The difference amplifier stage 16 further has a second input 16B at which the comparison voltage UC can be fed to it. The difference amplifier stage 16 further has a first output 16C from which the difference amplifier stage 16 can emit the information stored by means of storage means 5 in the form of information data ID. The information data ID represents a first logic state if the value of the information voltage UI is higher than the value of the comparison voltage UC and the information data ID represents a second logic state if the value of the information voltage UI is lower than the value of the comparison voltage UC. The difference amplifier stage 16 further has a third input 16D at which it is arranged to receive a test signal TS. The difference amplifier stage 16 further has a second output 16E, at which second output 16E the difference amplifier stage 16 is arranged to emit a voltage representing the information voltage U1. The circuit 2 has a test terminal T connected to the second output 1 6E, from which the voltage representing the information voltage UI can be picked off. Hence the evaluation means 14 are arranged to make the information voltage UI available at terminal T in a way that can be controlled by means of the test signal TS.

Figure 4:
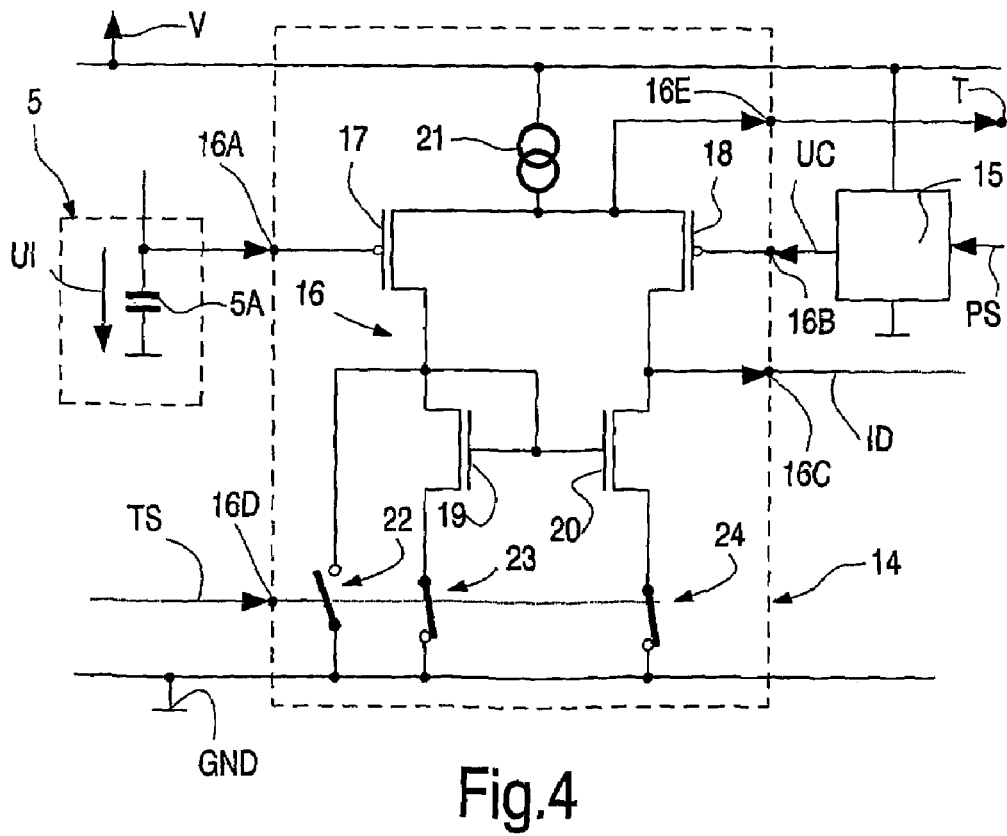
FIG. 4 shows a circuit implementing the second detail of the data carrier according to the invention shown in FIG. 1.

The difference amplifier stage 16 is shown in detail in FIG. 4. The difference amplifier stage 16 is implemented in the form of a first p-channel field effect transistor 17 and a second p-channel field effect transistor 18, with the control electrode of the first p-channel field effect transistor 17 forming the first input 16A and the control electrode of the second p-channel field effect transistor 18 forming the second input 16B. The source terminals of the two p-channel field effect transistors 17 and 18 are connected together and form the second output 16E. Between the two p-channel field effect transistors 17 and 18 and the supply voltage V is connected a current source 21. The drain terminals of the two p-channel field effect transistors 17 and 18 are connected to a current mirror, which current mirror is implemented in the form of a second n-channel field effect transistor 19 and a third n-channel field effect transistor 20. A third switch 22 is connected between the reference potential GND and the drain terminal of the first p-channel field effect transistor 17. A fourth switch 23 is connected between the reference potential and the source terminal of the second n-channel field effect transistor 19. A fifth switch 24 is connected between the reference potential GND and the source terminal of the third n-channel field effect transistor 20. The three switches 22, 23 and 24 are shown in their rest state. The three switches 22, 23 and 24 are implemented in the form of further field effect transistors (not shown in FIG. 4) and, when the test signal TS is present, which test signal TS sets the three switches 22, 23 and 24 to their active state, the difference amplifier stage 16 can be de-activated, by means of the switches 22, 23 and 24, from evaluating the information voltage UI, as a result of which a representation of the information voltage UI becomes available at the same time at the second output 16E. This gives the advantage that the information voltage UI, or rather its waveform over time, can be measured from outside the circuit 2 for test purposes. In the absence of the controlling test signal TS, the three switches 22 to 24 are controlled to their rest state, and the voltage difference arising between the first input 16A and the second input 16B is available amplified, by so-called "open-loop amplification", at the first output 16C in the form of the information data ID.

The comparison-voltage generating means 15 are arranged to take account of a value of the supply voltage V by virtue of the fact that the value of the comparison voltage UC that can be generated and emitted by the comparison-voltage generating means 15 is proportional to the value of the supply voltage V. This gives the advantage that there is a relationship between the value of the information voltage UI and the value of the comparison voltage UC that does actually allow them to be compared with one another. The comparison-voltage generating means 15 are further arranged to generate the comparison voltage UC in a programmable manner. For this purpose, the comparison-voltage generating means 15 are arranged to receive a programming signal PS that can be generated and emitted by the data-processing means 4. This gives the advantage that the value of the comparison voltage UC can be varied in a programmable manner, which enables the period of validity of an item of information stored by means of the storage means 5 to be acted on because, if the value of the comparison voltage UC is relatively high, any degradation of the information voltage UI caused by leakage currents will come into play at an earlier point in time than would be the case if the value of the comparison voltage UC were lower in relative terms.

In what follows, the operation of the data carrier 1 will now be elucidated by reference to a first example of an application of the data carrier 1 of FIG. 1.

In this example of an application it is assumed that the communication-related information that is to be stored for a period of time by means of the storage means 5 is to represent a communication status for a data carrier 1 that occurs in the event of an anti-collision communication, which status is used internally in the data carrier 1 and serves to indicate that successful communication has already taken place between the data carrier 1 and the communication device. An anti-collision communication of this kind is needed when there are a plurality of data carriers 1 present within a communication area of a communication device at the same time and the communication device first has to determine the data carrier 1 with which communication can be performed, with unique serial numbers stored in the data carriers 1 being used to identify the data carriers 1.

Each of the data carriers 1, which is situated in a virtually static position in the communication area of the communication device, first receives the unmodulated signal S, as a result of which a supply voltage V for the circuit 2 is generated by means of the transmit/receive means 3, thus enabling data to be processed in the data-processing means 4. The first thing this does is to cause the programming signal PS, which signal is intended for programming the comparison-voltage generating means 15 to generate a comparison voltage UC, to be generated and emitted to the comparison-voltage generating means 15. The programming signal PS causes the comparison-voltage generating means 15 to generate a comparison voltage UIC whose value is equal to 0.25 times the value of the supply voltage V.

The communication device first puts out, by means of the signal S, a so-called GROUP SELECT command. This command is received by the transmit/receive means 3 in each data carrier 1 and is emitted to the data-processing means 4 in the form of enquiry data RD. Answer data AD is then emitted by the data-processing means 4 to the transmit/receive means 3, which answer data AD represents the serial number of the data carrier 1.

The eventuality may occur in this case that a plurality of data carriers 1 answer virtually simultaneously and in so doing produce load modulations of the signal S that correspond to their respective serial numbers, in which case the communication device is then unable to receive a valid serial number and emits a FAIL command. In the data carriers 1, the enquiry data RD representing the FAIL command is then processed by the data-processing means and, on the basis of a random number for example, then causes the data carriers 1 to emit their serial numbers to the communication device in different time ranges, as a result of which it is possible for the communication station to recognize each serial number unambiguously.

The serial number received by the communication device is used to read out the answer data AD from the data carrier 1, a READ WITH SERIAL NUMBER command being sent to the data carrier 1 for this purpose, in which case only the data carrier 1 whose internally stored serial number matches the serial number received communicates answer data AD to the communication device.

It is precisely in this data carrier 1 that the control signal CS is generated by means of the data-processing means 4 and is emitted to the information-voltage generating means 6, the value of the voltage of the control signal CS being equal to the value of the supply voltage V. In the information-voltage generating means 6, the value of the voltage of the control signal CS is raised by means of the voltage-raising means 8 to twice the value of the supply voltage V. The control signal CS' of raised voltage that is obtained in this way is fed to the voltage-limiting means 9, by means of which the value of the control signal CS' of raised voltage is limited to a value which is equal to the value of the supply voltage V increased by 0.7 volts. The voltage-limited control signal CS" obtained in this way is fed to the first n-channel field effect transistor 7A in the charging-current generating stage 7 and drives it to the conducting state. The storage capacitor 5A is then charged by means of the charging current fed from the current source 7B until such time as the value of the information voltage UI arising at point P in the circuit is virtually identical to the value of the supply voltage V because the value of the voltage of the voltage-limited control signal CS" is higher than the value of the supply voltage V by 0.7 volts, or in other words by exactly the gate-source threshold voltage of the first n-channel field effect transistor 7A. Hence, in the case of this data carrier 1, the information that successful communication has already taken place with a communication station using the serial number of the data carrier 1 has been stored by means of the storage means 5 using the full value available of the supply voltage V.

However, because all the other data carriers 1 present are also endeavoring to achieve this status, the anti-collision communication is carried out again until successful communication has taken place with all the data carriers 1 using their respective serial numbers. In the process, when the GROUP SELECT command is again received, the information data emitted by the evaluation means is first queried in the data carrier 1 and there is no further participation in an anti-collision communication if the information data ID indicates that the value of the information voltage UI is higher than the value of the comparison voltage UC.

The information represented by means of the information voltage UI is available temporarily after it has been generated, because the information voltage UI is subject to degradation caused by the leakage currents in circuit 2. However, during this "life" of the information, the supply voltage can even drop below a critical value required for the supply of the data-processing means 4, which may happen in the course of the communication if for example the data carrier 1 is briefly screened off from the signal S or if there is a frequency hopping process, without the information being lost or becoming invalid during the life. Selecting a figure of 0.25 times the value of the supply voltage V as a value for the comparison voltage UC ensures that even when there is a relatively large number of data carriers 1 within the communication area the life of the stored information will be long enough to outlast successful communication with all the data carriers 1.

It should be mentioned at this point that after successful communication with all the data carriers 1 the communication device puts out an INITIALIZE command that causes the information stored by means of the storage means 5 to be deleted in all the data carriers 1 situated in the communication area of the communication device, which is done in conventional fashion by means of a deleting transistor (not shown in FIG. 1) by means of which the storage capacitor 5A is discharged.

In what follows, the operation of the data carrier 1 will now be elucidated by reference to a second example of an application of the data carrier 1 of FIG. 1.

In this example of an application, it is assumed that a data carrier 1 is in each case situated on a product and that a plurality of such products are being moved on a conveyor belt at relatively high speed through two communication areas, belonging to two different communication devices, which areas are arranged one behind the other in the direction of movement and do not overlap one another.

In this case too an anti-collision communication has to be carried out if there is a plurality of data carriers 1 present within a communication area at the same time. However, to avoid the situation that, when there is information stored in a data carrier 1 by means of the information voltage UI that successful communication has already taken place with the first communication device, this information will still be valid when the communication area of the second communication device is passed through, a comparison voltage IC whose value is equal to 0.75 times the value of the supply voltage V is generated by means of the programming signal on entry into the first communication area, i.e. that belonging to the first communication device.

This is a simple way of ensuring that the life of the information is sufficiently short to ensure that, even if the INITIALIZE command is not received by the data carrier 1, the value of the information voltage UI will be below the value of the comparison voltage UC on entry into the communication area of the second communication device. This ensures that the data carrier 1 cannot pass through the communication area of the second communication device without proper communication, i.e. anti-collision communication where required, taking place with it.

It should also be mentioned that the storage means may have a number of storage locations and that a number of information-voltage generating means and evaluation means equal to the number of storage locations may be provided.

It should further be mentioned that the signal may be phase-modulated or frequency-modulated.

The invention claimed is:

1. A data carrier that is arranged to receive a signal in a non-contacting manner and that has an electrical circuit, to which circuit the signal can be fed and which circuit is arranged to generate a supply voltage for parts of the circuit by using the signal, which circuit comprises storage means that are arranged to store information capacitively, the information being represented by a value of an information voltage arising at the storage means, which value of the information voltage is at most equal to the value of the supply voltage, and which circuit has evaluation means to which the information voltage can be fed and that are arranged to evaluate the information voltage, with the help of a comparison voltage, for the information represented by the information voltage, characterized in that comparison-voltage generating means that are arranged to generate and emit the comparison voltage are implemented separately from the evaluation means, and in that the evaluation means are ranged to receive the comparison voltage from the comparison-voltage generating means.

2. A data carrier as claimed in claim 1, characterized in that the evaluation means are formed by a difference amplifier stage, which difference amplifier stage is intended to amplify the difference between the information voltage and the comparison voltage.

3. A data carrier as claimed in claim 1, characterized in that the circuit has a test terminal from which a representation of the information voltage can be picked off, and in that the evaluation means are arranged to make the information voltage available at the test terminal In a way that can be controlled.

4. A data carrier as claimed in claim 1, characterized in that the comparison-voltage generating means are arranged to take account of a value of the supply voltage when generating the comparison voltage.

5. A data carrier as claimed in claim 1, characterized in that the comparison-voltage generating means are arranged to generate the comparison voltage in a programmable manner.

6. A circuit for a data carrier, which data carrier is arranged to receive a signal in a non-contacting manner, which circuit is arranged, by using the signal, to generate a supply voltage for parts of the circuit, which circuit comprises storage means that are arranged to store information capacitively, the information being represented by a value of an information voltage arising at the storage means, which value of the information voltage is at most equal to the value of the supply voltage, and which circuit has evaluation means to which the information voltage can be fed and that are arranged to evaluate the information voltage, with the help of a comparison voltage, for the information represented by the information voltage, characterized in that comparison-voltage generating means tat are arranged to generate and emit the comparison voltage are implemented separately from the evaluation means, and in that the evaluation means are arranged to receive the comparison voltage from the comparison-voltage generating means.

7. A circuit as claimed in claim 6, characterized in that the evaluation means are formed by a difference amplifier stage, which difference amplifier stage is intended to amplify the difference between the information voltage and the comparison voltage.

8. A circuit as claimed in claim 6, characterized in that the circuit has a test terminal from which a representation of the information voltage can be picked off, and in that the evaluation means are arranged to make the information voltage available at the test terminal in a way that can be controlled.

9. A circuit as claimed in claim 6, characterized in that the information-voltage generating means are arranged to take account of a value of the supply voltage when generating the comparison voltage.

10. A circuit as claimed in claim 6, characterized in that the comparison-voltage generating means are arranged to generate the comparison voltage in a programmable manner.

11. A circuit as claimed in claim 6, characterized in that the circuit is implemented in the form of an integrated circuit.

* * * * *